United States Patent
Kim

(10) Patent No.: US 9,303,755 B2
(45) Date of Patent: Apr. 5, 2016

(54) POP-UP TYPE ELECTRONIC AUTO SHIFT LEVER

(71) Applicant: Hyundai Motor Company, Seoul (KR)

(72) Inventor: Eun-Sik Kim, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 174 days.

(21) Appl. No.: 14/098,483

(22) Filed: Dec. 5, 2013

(65) Prior Publication Data

US 2015/0053038 A1    Feb. 26, 2015

(30) Foreign Application Priority Data

Aug. 21, 2013  (KR) .................. 10-2013-0099201

(51) Int. Cl.
*F16H 59/10* (2006.01)
*B60K 20/04* (2006.01)
*F16H 63/42* (2006.01)

(52) U.S. Cl.
CPC .............. *F16H 59/105* (2013.01); *B60K 20/04* (2013.01); *F16H 59/10* (2013.01); *F16H 2063/423* (2013.01); *Y10T 74/2014* (2015.01)

(58) Field of Classification Search
None
See application file for complete search history.

(56) References Cited

U.S. PATENT DOCUMENTS

| | | | | |
|---|---|---|---|---|
| 8,601,896 B2 * | 12/2013 | Skogward | ...................... | 74/473.3 |
| 9,027,428 B2 * | 5/2015 | Iwata | .......................... | 74/473.12 |
| 2007/0204718 A1 * | 9/2007 | Strait et al. | ....................... | 74/523 |
| 2008/0100086 A1 * | 5/2008 | Vermeersch et al. | ........... | 296/70 |
| 2010/0307276 A1 * | 12/2010 | Giefer et al. | ................. | 74/473.3 |
| 2012/0025810 A1 * | 2/2012 | Uhlenbruck | ............... | 324/207.2 |
| 2012/0234124 A1 * | 9/2012 | Nozaki et al. | .............. | 74/473.12 |
| 2014/0121918 A1 * | 5/2014 | Davis et al. | ..................... | 701/55 |
| 2014/0150590 A1 * | 6/2014 | Yamada | ....................... | 74/473.3 |

FOREIGN PATENT DOCUMENTS

| | | | |
|---|---|---|---|
| JP | 2001-259244 A | 9/2001 | |
| JP | 2008-184079 A | 8/2008 | |
| KR | 2001-0078374 A | 8/2001 | |
| KR | 10-2006-0102142 A | 9/2006 | |
| KR | 10-2013-0015362 A | 2/2013 | |
| KR | 10-2013-0040343 A | 4/2013 | |

* cited by examiner

*Primary Examiner* — Justin Holmes
(74) *Attorney, Agent, or Firm* — Morgan, Lewis & Bockius LLP

(57) ABSTRACT

A pop-up type electronic auto shift lever is disposed in a console of a vehicle and interworks with an automatic transmission control unit of an automatic transmission. The pop-up type electronic auto shift lever may include a pop-up lever, a pop-up part and a controller which controls the pop-up lever and the pop-up part. The controller controls the pop-up lever to be inserted into the console of the vehicle when the pop-up lever is not used, and controls the pop-up lever to protrude outside the console of the vehicle when the pop-up lever is used.

10 Claims, 13 Drawing Sheets

(a)  (b)

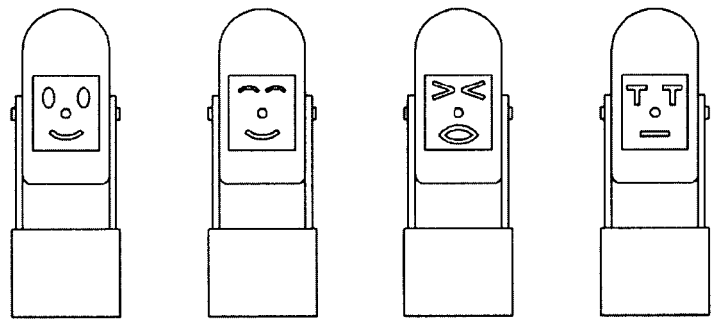
EMOTION INFORMATION
FIG. 14B
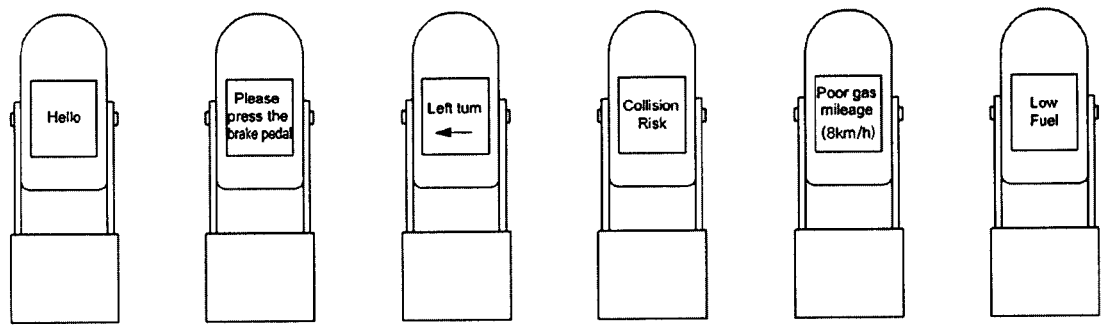
NOTIFICATION INFORMATION

POP-UP TYPE ELECTRONIC AUTO SHIFT LEVER

CROSS-REFERENCE TO RELATED APPLICATIONS

The present application claims priority of Korean Patent Application Number 10-2013-0099201 filed on Aug. 21, 2013, the entire contents of which application are incorporated herein for all purposes by this reference.

BACKGROUND OF INVENTION

1. Field of Invention

The present invention relates to an electronic auto shift lever, and more particularly, to a pop-up type electronic auto shift lever in an auto shift lever in an auto shift vehicle in which a shift operation unit of the auto shift lever includes a touch screen, and a predetermined shift pattern is provided to a user to perform a shift operation through an input through the touch screen, the shift operation unit being disposed inside a console and popped up only when the shift operation unit is used, thereby effectively using a space disposed on a console, and providing various shift patterns in response to preference of a user.

2. Description of Related Art

In general, in order to control a gear shift stage of a vehicle, examples of a shift lever provided in the vehicle include a mechanical shift lever and an electronic shift lever, and usage of the electronic shift lever has been recently increased.

Among the mechanical shift lever and the electronic shift lever, the electronic shift lever is generally disposed in a console inside a driver's seat of the vehicle, but the lever protrudes from an upper portion of the console, so that a user easily operates the shift lever. The aforementioned configuration provides a similar operational feeling to that of the mechanical shift lever in the related art, thereby enabling a user to easily control the gear shift stage.

FIG. 1 illustrates an example of an electronic shift lever in the related art. As illustrated in FIG. 1, the electronic shift lever in the related art is disposed on a console inside a vehicle similar to the mechanical shift lever, and the shift lever protrudes from an upper portion of the console, so that a shift operation is performed by operating the shift lever by a driver. In this case, the shift lever is fixed onto the console to be movable in a lateral direction.

However, the electronic shift lever including the aforementioned configuration in the related art has some problems. For example, an operation method of the electronic shift lever in the related art is similar to that of the mechanical shift lever in the related art, so that the electronic shift lever does not have a unique and significant advantage (a method of operating the lever back and forth in a lateral direction).

The shift lever occupies a large space, so that a space for accommodating a cup holder, and the like is small, and it is impossible to provide a necessary button function (a disadvantageous layout of the console). The shift lever protrudes from the upper portion of the console, so that a part of a body including a head of a driver bumps into the shift lever during a vehicle collision, thereby causing a severe injury. The shift lever protrudes from the console, so that the appearance is bad, and it is difficult to recognize an indication lamp of the gear shift stage at the shift lever side.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a pop-up type electronic auto shift lever in an auto shift lever in an auto shift vehicle in which a shift operation unit of the auto shift lever includes a touch screen, and a predetermined shift pattern is provided to a user to perform a shift operation through an input through the touch screen, the shift operation unit being disposed inside a console and popped up only when the shift operation unit is used, thereby effectively using a space disposed on a console, and providing various shift patterns in response to preference of a user.

Various aspects of the present invention provide a pop-up type electronic auto shift lever which is disposed in a console of a vehicle, and interworks with an automatic transmission control unit of an automatic transmission. The pop-up type electronic auto shift lever may include: a pop-up lever which includes a gear shift stage input unit including a touch screen, and generates a gear shift stage input signal according to a touch input of the gear shift stage input unit, and outputs the generated gear shift stage input signal; a pop-up part which includes a pop-up motor, and is disposed at a lower end of the pop-up lever, and pops up the pop-up lever when being driven; and a controller which controls the pop-up lever and the pop-up part, provides gear shift stage information to the gear shift stage input unit of the pop-up lever, generates a shift signal based on the gear shift stage input signal received from the gear shift stage input unit, and transmits the generated shift signal to the automatic transmission control unit of the vehicle, in which the controller controls the pop-up lever to be inserted into the console of the vehicle by driving the pop-up part when the pop-up lever is not used, and controls the pop-up lever to protrude outside the console of the vehicle by driving the pop-up part when the pop-up lever is used.

The pop-up lever may include: a head part which includes the gear shift stage input unit; a supporting part which is disposed under the head part, and hinge-coupled to the head part, and supports the head part to be rotatable in a vertical direction; and an internal rotation motor which is embedded inside the head part, rotates the head part when being driven, and is controlled by the controller.

The head part may further include an information display unit which includes one or more touch screens, and is disposed on a side surface of the head part, the controller may provide one or more of emotion information and notification information to the information display unit, and the information display unit may display the emotion information or the notification information provided from the controller.

The gear shift stage input unit may be disposed at a lower surface of the head part, and when a touch is input from the information display unit, the controller may drive the internal rotation motor to control the head part to rotate by about 180°, to upwardly expose the gear shift stage input unit.

The controller may interwork with a collision detection sensor of the vehicle, and drive the pop-up motor during a vehicle collision to control the pop-up lever to be inserted into the console.

The pop-up type electronic auto shift lever may further include a rotation torque motor which is disposed between the pop-up lever and the pop-up part in a vertical direction and connects the pop-up lever and the pop-up part, in which the rotation torque motor may be controlled by the controller, and when the rotation torque motor operates, the pop-up lever may be rotated in a horizontal direction. The body of the rotation torque motor may be coupled with and fixed to a lower end of the supporting part of the pop-up lever, a rod of the rotation torque motor may be fixedly coupled to an upper end of the pop-up part, and the pop-up lever and the pop-up part may be connected with each other.

The controller may interwork with a navigation system provided in the vehicle, receive steering guide information of the navigation system, and control the rotation torque motor to be rotated in a direction corresponding to a direction of the steering guide information. The controller may control the internal rotation motor so as for the head part to be rotated by about 90° when the pop-up lever is first popped-up.

The head part may further include a speaker unit which includes one or more speaker means, and the controller may provide one or more of the emotion information and the notification information to the speaker unit.

In the gear shift stage information provided by the controller, relative information between each gear shift stage and an adjacent gear shift stage may be preset and stored in setting a plurality of elements of gear shift stage information of the vehicle, when a slide input is performed on the gear shift stage input unit, the gear shift stage input unit may output slide input information including a slide direction, and the controller may provide the gear shift stage input unit with information about an adjacent gear shift stage corresponding to the direction of the slide input information, and when a touch input is performed on the gear shift stage input unit, the gear shift stage input unit may generate a gear shift stage input signal and output the generated gear shift stage input signal.

The pop-up type electronic auto shift lever may further include a pop-up button unit which is disposed on the console of the vehicle, and outputs a pop-up signal during the input, in which the controller may be connected with the pop-up button unit to drive the pop-up part so as to pop up the pop-up lever when receiving the pop-up signal.

According to various aspects of the present invention, a shift operation of the electronic shift lever is performed through the touch screen, so that a structure of the present invention is simpler than a configuration of the auto shift lever in the related art, an operational feeling is improved to increase input convenience, and it is possible to decrease a manufacturing cost.

Moreover, when the auto shift lever is not used, the auto shift lever is embedded inside the console, and when the auto shift lever is used, the auto shift lever is popped up outside the console, so that a volume occupied by the shift lever in the related art is not required, thereby improving performance of a package. Accordingly, the present invention provides an effect of improving an accommodation space inside the vehicle.

Further, when the auto shift lever is not used, the auto shift lever is popped down and embedded inside the console as described above, thereby improving aesthetic sense, and the auto shift lever is popped down even when a vehicle collides, thereby preventing a driver from being injured.

In addition, emotion information is provided to the auto shift lever, and the auto shift lever is controlled to be rotated in vertical and horizontal directions, thereby making a driver feel familiar with the auto shift lever.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 7(A) and FIG. 7)B) are side views illustrating an exemplary pop-up type electronic auto shift lever of the present invention.

FIGS. 14A and 14B respectively illustrates exemplary variations of emotion information and notification information displayed through an information display unit.

DETAILED DESCRIPTION

Figure 1:
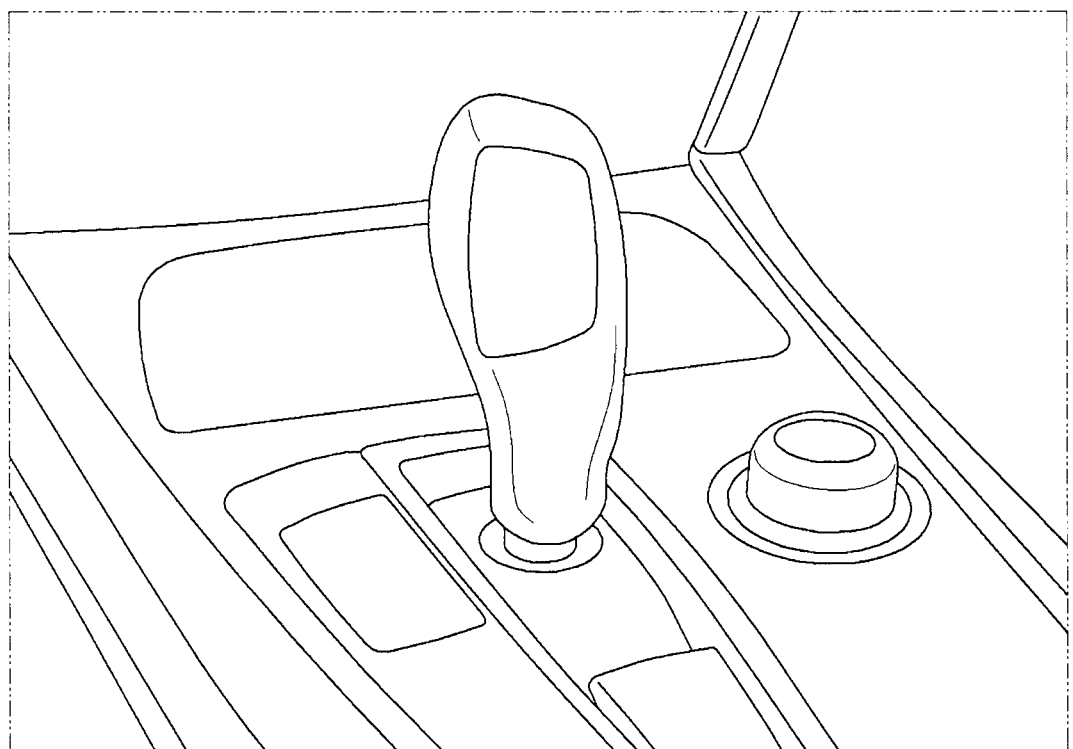
FIG. 1 illustrates an example of an electronic shift lever in the related art.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention is characterized in that an electronic auto shift lever is configured to include a pop-up lever including a touch screen, a predetermined shift pattern is provided to a user through the touch screen on the pop-up lever, and a shift operation is performed through an input from the touch screen. In this case, the pop-up lever has a pop-up structure in which the pop-up lever stands by in a state of being inserted into a console of a vehicle when the pop-up lever is not used, and the pop-up lever protrudes outside the console when the pop-up lever is used, so that there is no space occupied by the shift lever when the pop-up lever is not used, thereby more effectively using an internal space of the vehicle.

The pop-up type electronic auto shift lever of the present invention provides emotion information or notification information including characters, figures, and/or images through the touch screen in order to provide familiarity to a driver. In the pop-up type electronic auto shift lever of the present invention, the pop-up lever includes a head part and a supporting part, which are hinge-coupled to each other, in which the head part includes an internal rotation motor therein so as to rotate the head part when the pop-up type electronic auto shift lever is driven, thereby making a driver feel familiar with the pop-up lever.

Accordingly, by the aforementioned configuration, the present invention intends to make a driver feel as if the pop-up lever is a living thing, not a simple electronic shift lever, so as to provide familiarity, by outputting emotion information through the touch screen of the pop-up lever, and make a drive feel familiar with the pop-up lever by making a driver feel as if the pop-up lever bows to the driver by vertically rotating an upper part of the pop-up lever.

Hereinafter, exemplary embodiments of the present invention will be described in detail with reference to the accompanying drawings. In the following description, for convenience of description, a disposition of a constituent is specified by a word of "vertical" and "horizontal", and "vertical" means a direction vertical to a ground, and "horizontal" means a direction horizontal to the ground. However, the present invention is not limited thereto, and it is apparent to those skilled in the art that each constituent element of the present invention may be simply understood as a relative meaning between "vertical" and "horizontal" within a scope without departing from the technical spirit of the invention.

Figure 2A:
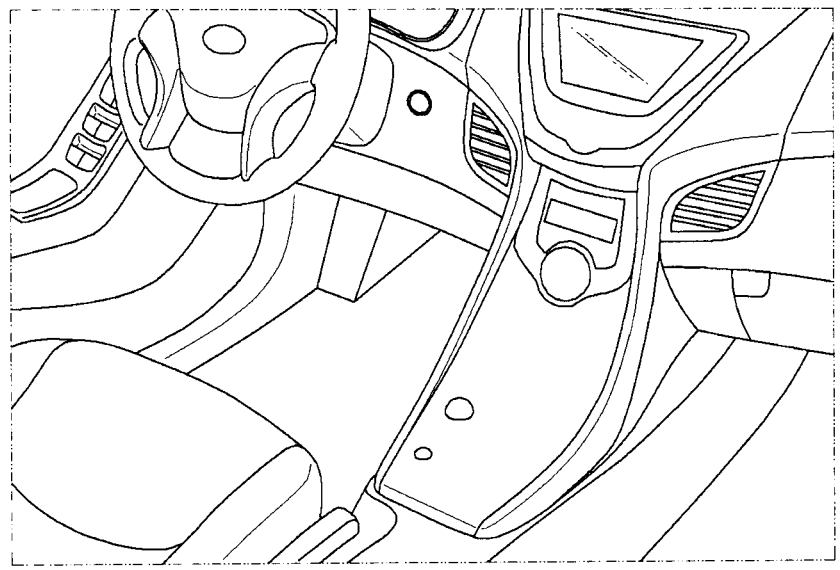
FIGS. 2A and 2B illustrates a state in which a pop-up lever is inserted into a console to be accommodated inside the console in a driver's seat to which an exemplary pop-up type electronic auto shift lever of the present invention is applied.
Figure 2B:
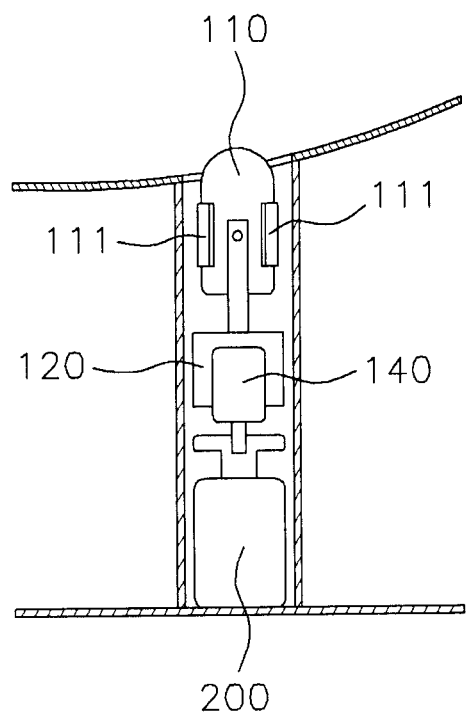
Figure 3A:
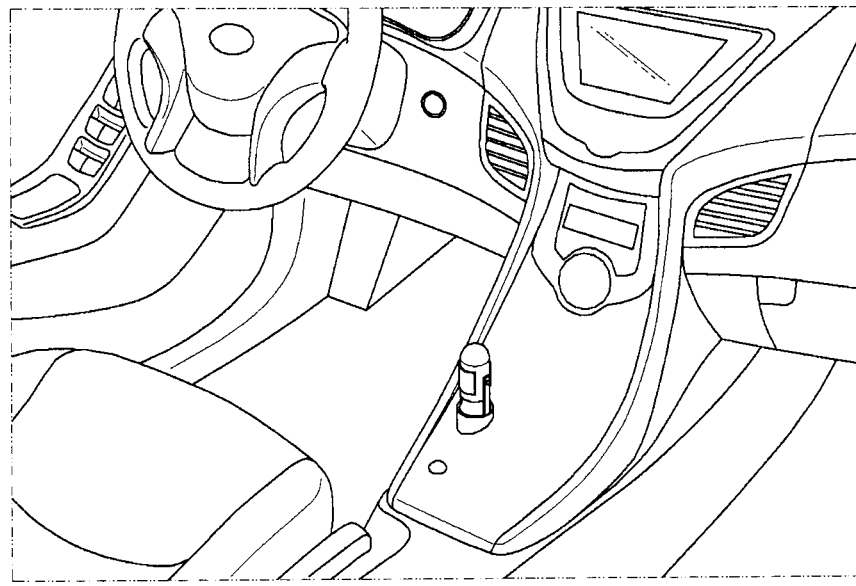
FIGS. 3A and 3B illustrates a state in which the pop-up lever protrudes outside the console in the driver's seat to which an exemplary pop-up type electronic auto shift lever of the present invention is applied.
Figure 3B:
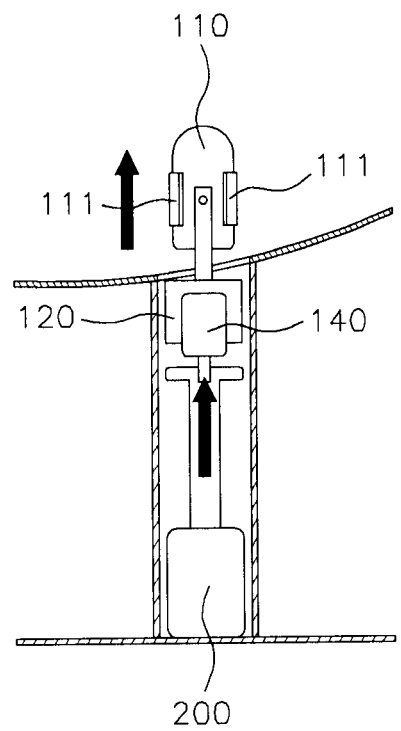

FIGS. 2A and 2B illustrate a state in which a pop-up lever is inserted into (popped-down) and accommodated inside a console in a driver's seat to which an exemplary pop-up type electronic auto shift lever of the present invention is applied, and FIGS. 3A and 3B illustrate a state in which the pop-up lever protrudes outside the console in the driver's seat to which an exemplary pop-up type electronic auto shift lever of the present invention is applied.

As illustrated, a pop-up type electronic auto shift lever 300 of the present invention is disposed instead of a shift lever of an electronic transmission, which is generally positioned on a console inside a vehicle, and has a structure (pop-up structure) in which the pop-up type electronic auto shift lever 300 is inserted into (popped-down) and accommodated inside the console when the pop-up type electronic auto shift lever 300 is not used, and the pop-up type electronic auto shift lever 300 protrudes (is popped-up) outside the console when the pop-up type electronic auto shift lever 300 is used, so as to more widely use a space on the console.

As described above, the pop-up type electronic auto shift lever 300 of the present invention provides emotion information including characters, a picture, or an image through the electronic auto shift lever, so as to provide familiarity to a driver. To this end, the pop-up type electronic auto shift lever 300 includes an information display unit 111 including a touch screen means. Accordingly, a driver driving a vehicle to which the pop-up type electronic auto shift lever 300 of the present invention is applied may feel familiar through the information provided through the information display unit 111.

The pop-up type electronic auto shift lever 300 further includes a gear shift stage input unit 112 including a touch screen, and is configured so that a gear shift stage is input through the gear shift stage input unit 112.

The vehicle, to which the present invention is applied, does not require an internal space occupied by the shift lever in the related art, through the structure in which the pop-up type electronic auto shift lever 300 protrudes when being used, and is accommodated inside the console when not being used, as compared to a vehicle including an auto shift lever in the related art, and therefore it is possible to increase an accommodation space within the vehicle, and it is possible to secure a space of a driver's seat.

The pop-up type electronic auto shift lever 300 of the present invention includes a controller, which interworks with an automatic transmission control unit of the electronic automatic transmission of the vehicle and controls general driving of the pop-up type electronic auto shift lever 300, a pop-up lever 100 which is accommodated inside the console of the vehicle, and popped up and protrudes outside when necessary (when being used), a pop-up part 200 which pops up the pop-up lever 100, and a gear shift stage input unit 112 which is disposed in the pop-up lever 100 and connected with the controller, receives gear shift stage information from the controller, and displays the received gear shift stage information, and transmits a gear shift stage input signal generated by a touch to the controller.

The pop-up lever 100 is disposed on the console inside the vehicle, and may be disposed at the same position as a position at which the electronic transmission lever is disposed. Accordingly, the pop-up lever 100 is disposed at a similar position to that of the electronic shift lever used when a driver drives the vehicle in the related art, thereby preventing confusion of the driver.

In the meantime, the gear shift stage input unit 112 may include any kind of touch screen, for example, an electrostatic touch screen or a resistive touch screen, which displays information and on which a display surface is touched to perform an input.

The controller is a means provided to control the pop-up lever 100 and the gear shift stage input unit 112, receive a gear shift stage input signal output from the gear shift stage input unit 112, generate a shift signal, and transmit the generated shift signal to the automatic transmission control unit of the vehicle, and is a constituent element for controlling general driving of the pop-up type electronic auto shift lever 300 of the present invention.

The controller interworks with the automatic transmission control unit of the vehicle, receives the gear shift stage input signal input through the gear shift stage input unit 112, generates the shift signal (a process of processing the signal may be included in this process, and the process is known so that a description thereof will be omitted), and transmits the generated shift signal to the automatic transmission control unit, thereby making the automatic transmission control unit control a gear shift stage of the vehicle. Accordingly, the controller is a means for transmitting the input of the driver received through the pop-up lever 100 to the automatic transmission control unit.

The controller may be mounted inside the console of the vehicle, but the present invention is not limited thereto, and the controller may be installed at a position other than the inside of the console of the vehicle. Further, the controller may include a electronic control unit (ECU), and may be a module combined with a body control module (BCM) or an ECU, which is basically installed for driving of the vehicle.

The controller presets and stores gear shift stages including a P-stage, an R-stage, an N-stage, a D-stage, an M-stage, a +-stage, and a −-stage, which are gear shift stages of the vehicle, position information including a position at which the gear shift stage is to be displayed, and gear shift stage information including information about a relative position between the respective gear shift stages included in the gear shift stage information.

Accordingly, the controller generates the gear shift stage information based on the plurality of gear shift stages, the position information, and the information about the relative position when generating the gear shift stage information, and transmit the generated gear shift stage information to the gear shift stage input unit 112.

The gear shift stage information transmitted through the controller as described above is displayed through the gear shift stage input unit 112, and when a user performs an input in response to the displayed gear shift stage information, the gear shift stage input unit 112 generates a gear shift stage input signal according to the input of the user and transmits the generated gear shift stage input signal to the controller.

As a result, the controller generates a shift signal allocated to the gear shift stage input signal received from the gear shift stage input unit 112 and transmits the generated shift signal to the automatic transmission control unit of the vehicle, so that the gear shift stage is shifted.

Figure 4:
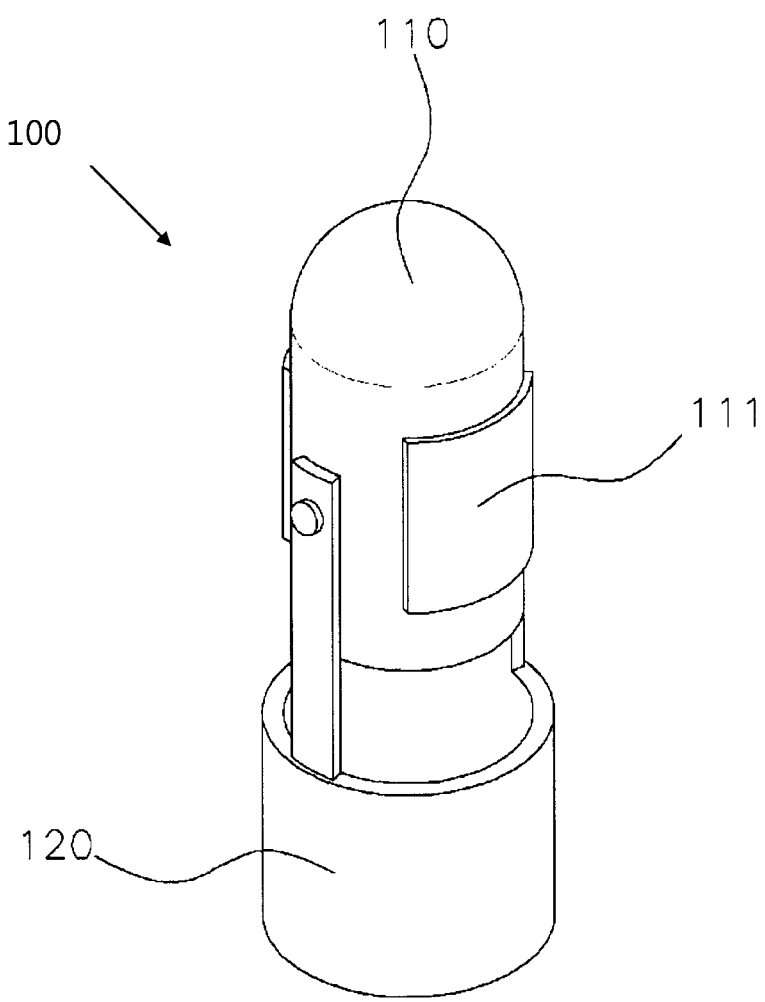
FIG. 4 is a perspective view illustrating an exemplary pop-up lever of an exemplary pop-up type electronic auto shift lever of the present invention in detail.
Figure 5:
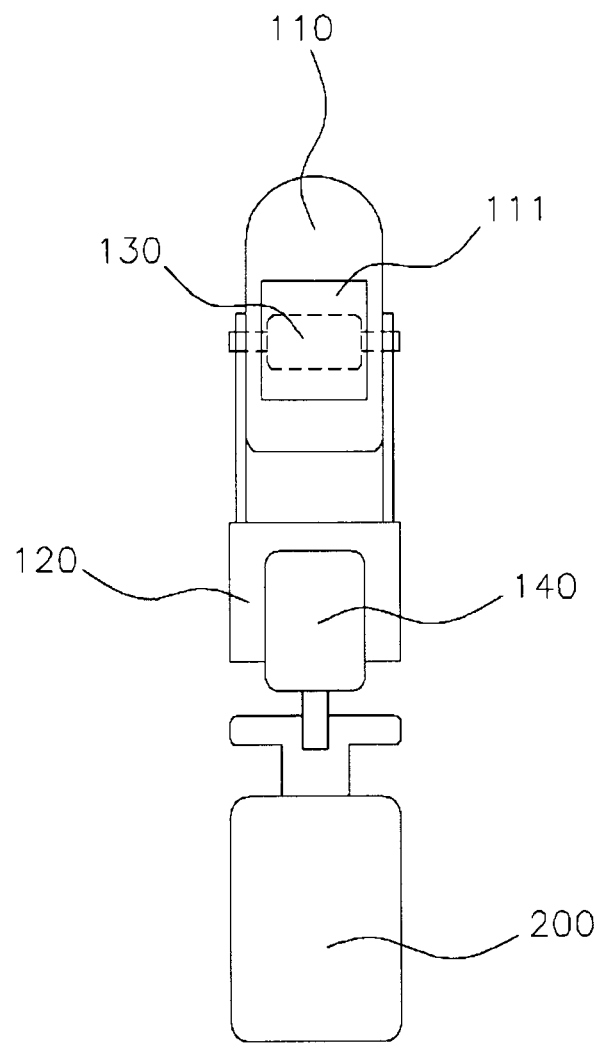
FIG. 5 is an exploded diagram illustrating an inside of an exemplary pop-up lever.
Figure 6A:
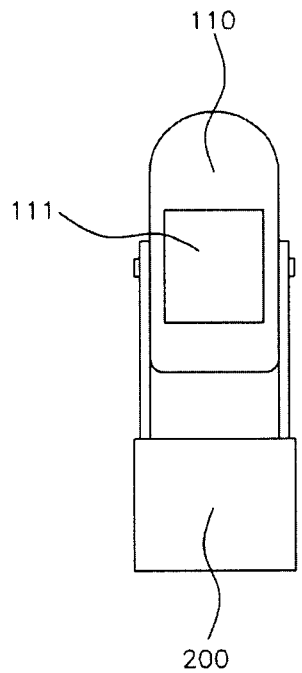
FIGS. 6A, 6B, and 6C illustrates each of a front side, a side, and a rear side of an exemplary pop-up lever respectively.
Figure 6B:
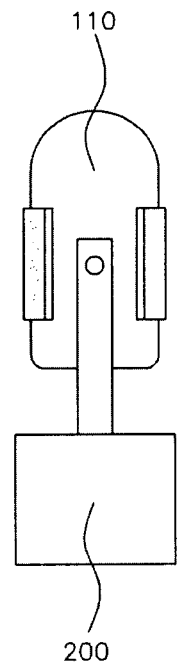
Figure 6C:
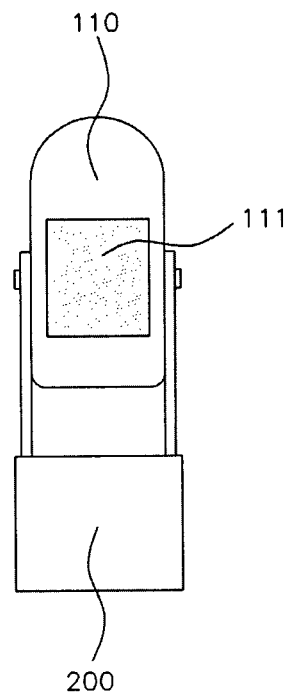

FIG. 4 is a perspective view illustrating an exemplary pop-up lever of the pop-up type electronic auto shift lever of the present invention in detail, FIG. 5 is an exploded diagram illustrating an inside of an exemplary pop-up lever, and FIGS. 6A, 6B, and 6C illustrate each of a front side, a side, and a rear side of an exemplary pop-up lever respectively. As illustrated, the pop-up lever 100 of the present invention includes a head part 110 and a supporting part 120.

The head part 110 is a constituent element positioned at an upper end of the pop-up lever 100, and is a part which the user directly operates when the pop-up lever 100 protrudes. One, two or more information display units 111 are provided at the sides of the head part 110, which in some cases are opposite to each other, respectively, and the gear shift stage input unit 112 for a shift operation is formed on a lower surface of the head part 110.

In various embodiments of the present invention, the upper end of the head part 110 may be formed in a curved surface so as to prevent the pop-up lever 100 from being damaged due to impact and prevent the driver from being injured, when the pop-up lever is popped up, but it is apparent to those skilled in the art that the present invention is not limited thereto.

An internal rotation motor 130 may be disposed inside the head part 110 in a horizontal direction. The internal rotation motor 130 is provided so as to rotate the head part 110, and includes a rod of the internal rotation motor 130 for hinge-coupling with the supporting part 120 to be described below. Accordingly, when power is applied to the internal rotation motor 130, the internal rotation motor 130 generates rotational force, and the rotation force generated from the internal rotation motor 130 is transmitted to the rod of the internal rotation motor 130 so as to serve to rotate the head part 110 in a vertical direction.

The supporting part 120 is disposed under the head part 110, and is hinge-coupled with the head part 110 (by the rod of the internal rotation motor 130). Accordingly, the head part 110 hinge-coupled with and supported by the supporting part 120 is rotatable in the vertical direction based on a hinge-coupled portion as an axis.

In various embodiments of the present invention, the supporting part 120 includes a pair of supports on a base, and has a structure in which a hole (to which the rod of the internal rotation motor 130 is inserted and coupled so as to be hinge-coupled) for hinge-coupling with the head part 110 is perforated at a distal end of each of the support. The pair of supports protrudes upwardly from an upper surface of the base in a vertical direction, and the head part 110 is positioned between the pair of supports.

The rod of the internal rotation motor 130 may be coupled with and fixed to the pair of supports, so that when the rotational force is transmitted from the internal rotation motor 130, the head part 110 rotates based on the rod of the internal rotation motor 130 as an axis.

Figure 7:
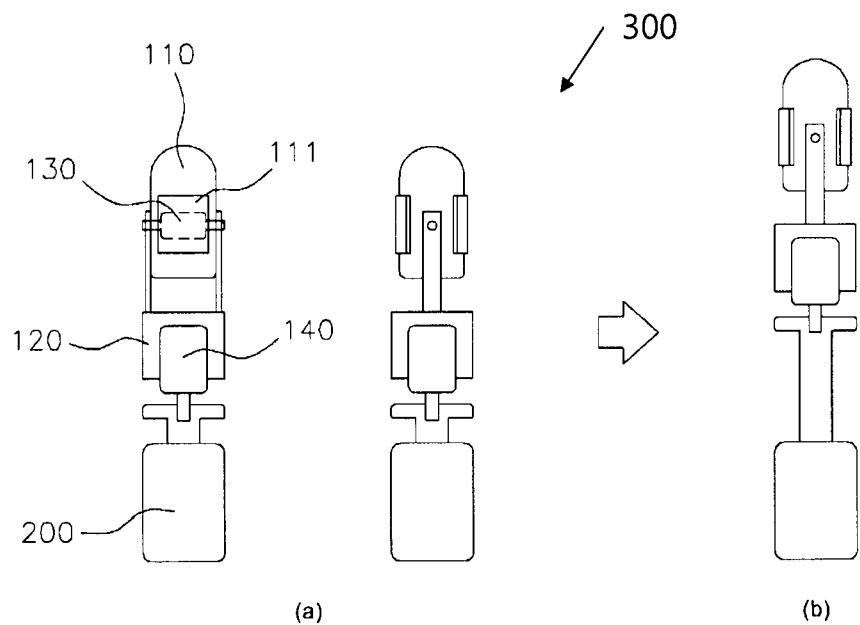

In the meantime, as illustrated in FIG. 7, the pop-up type electronic auto shift lever 300 of the present invention further includes a pop-up part 200 for popping up the pop-up lever 100 and a rotation torque motor 140 for providing rotational torque to the pop-up lever 100, at a lower portion of the pop-up lever 100 including the aforementioned configuration.

The pop-up part 200 includes a straight motor, that is, a pop-up motor, and a pop-up plate formed at a distal end of the pop-up motor, and is disposed in a vertical direction, so that the distal end of the pop-up motor moves up (pop-up) or moves down (pop-down) in the vertical direction when driving the pop-up part 200, so as to move up or move down the pop-up plate coupled to the distal end of the pop-up motor, thereby popping up the pop-up lever 100 coupled to the pop-up plate.

In various embodiments of the present invention, the pop-up part 200 is controlled by the controller, but the present invention is not limited thereto, and may further include a separate pop-up controller provided for driving the pop-up part 200.

In various embodiments of the present invention, the present invention may include a pop-up button unit formed of a separate button, switch, or sensor for driving the pop-up part 200, and the pop-up button unit may be positioned on the console inside the vehicle. However, an installation position of the pop-up button part is not limited.

The pop-up button part outputs a pop-up signal during an operation of the pop-up button unit, and the pop-up signal is transmitted to the controller. The controller is connected with the pop-up button unit to drive the pop-up unit 200 so as to pop up the pop-up lever 100 when receiving the pop-up signal. In the meantime, the pop-up part 200 and the pop-up lever 100 may be coupled with each other by the rotation torque motor 140.

The rotation torque motor 140 is coupled to a lower end of the supporting part 120 of the pop-up lever 100 in the vertical direction, and the rod of the rotation torque motor 140 may be coupled to a center portion of an upper end of the pop-up plate of the pop-up motor. That is, the upper end of the rotation torque motor 140 (that is, a body of the rotation torque motor 140) is coupled with the lower end of the pop-up lever 100 (that is, the lower end of the supporting part 120) and a lower end of the rotation torque motor 140 (that is, the rod of the rotation torque motor 140) is coupled with and fixed to an upper end of the pop-up part 200 (that is, the upper end of the pop-up plate). In this case, it is apparent that the vertical disposition of the rotation torque motor 140 may be contrary thereto.

The rotation torque motor 140 is a means for generating rotational force when power is applied thereto, and the rotational force generated by the rotation torque motor 140 rotates the rod of the rotation torque motor 140. In this case, the rod of the rotation torque motor 140 is fixed onto the pop-up plate, so that the rotation force generated by the rotation torque motor 140 rotates the body of the rotation torque motor 140, and thus the pop-up lever 100 is rotated.

FIG. 7 illustrates a case before the pop-up lever 100 is popped-up (a) and a case after the pop-up lever 100 is popped-up (b). As illustrated in (a), the pop-up part 200 is in a state in which the pop-up plate maximally moves down before an operation. This case is a stage before a driver uses the pop-up type electronic auto shift lever 300 of the present invention, and is a state in which the pop-up lever 100 is accommodated inside the console of the vehicle.

When the pop-up button unit is operated by the driver, the pop-up button unit outputs a pop-up signal, and the pop-up signal is transmitted to the controller. The controller controls the pop-up motor of the pop-up part 200 to move up the pop-up lever 100 as illustrated in (b).

Accordingly, the pop-up plate formed at the distal end of the pop-up motor moves up in the vertical direction, and the head part 110 coupled to the upper end of the pop-up plate moves up, and as a result, the head part 110 protrudes outside the console of the vehicle.

Figure 8:
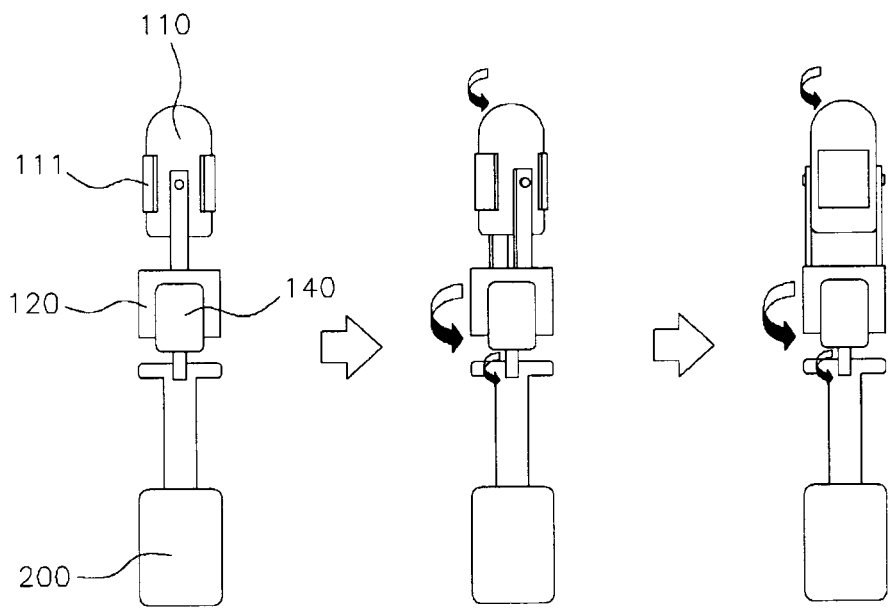
FIG. 8 illustrates an exemplary process in which a head part rotates in a horizontal direction driven by a rotation torque providing unit.

FIG. 8 illustrates a process in which the head part rotates in a horizontal direction driven by a rotation torque providing unit.

The pop-up type electronic auto shift lever 300 of the present invention may pop up the pop-up motor as described above, and may also transmit a message to the driver by using the rotation of the pop-up lever 100. In this case, the controller may provide rotational force in different directions or at different speeds according to a state of the vehicle by interworking with the BCM, the ECU, a navigation module, or the like of the vehicle, thereby enabling the driver to receive steering guide information by the rotation of the pop-up motor.

For example, the controller may receive the steering guide information corresponding to a path guided by the navigation module by interworking the navigation module, and more particularly, the controller may receive the steering guide information from the navigation module, and rotates the pop-up lever 100 in a direction corresponding to the received steering guide information, so that the driver may feel the rotation and receive a direction guide.

The "steering guide information" described in the present specification indicates all of the guide information provided in response to a position of a corresponding vehicle for guiding a path to a set destination to the driver by the navigation module, and may include, for example, information about a left turn, a right turn, a U-turn and the like.

In this case, the controller receives the steering guide information of the navigation module to rotate the rotation torque motor in a direction corresponding to a direction indicated by the steering guide information, thereby controlling the driver to be guided by the steering guide.

In various other embodiments of the present invention, when a corresponding vehicle deviates from a path set to a destination, the controller may inform a driver of a path deviation by rotating the pop-up motor in a direction opposite to the deviation direction, or in a case where a gear shift stage is shifted in a state when a brake pedal is not stepped during the shift of the gear shift stage, the controller may warn the driver through repeated rotations in directions opposite to each other. When an obstacle is recognized by a sensor when the vehicle moves forward or backward, the controller may make the obstacle to be recognized through the rotation of the pop-up lever 100.

The process is performed by the rotation torque motor 140. The rotation torque motor 140 is coupled to the lower end of the supporting part 120 in the vertical direction as described above. Accordingly, the rod of the rotation torque motor 140 rotates in the horizontal direction during the driving, so that the pop-up lever 100 rotates in the horizontal direction.

In this case, as described above, the rod of the rotation torque motor 140 is fixed onto the pop-up part 200, more particularly, the upper portion of the pop-up plate of the pop-up part 200, so that the rotational force generated by the rotation torque motor 140 rotates the body of the rotation torque motor 140 in the horizontal direction based on the fixed rod of the rotation torque motor 140 as an axis. As a result, the entire pop-up lever 100 coupled to the body of the rotation torque motor is rotated in the horizontal direction.

Figure 9:
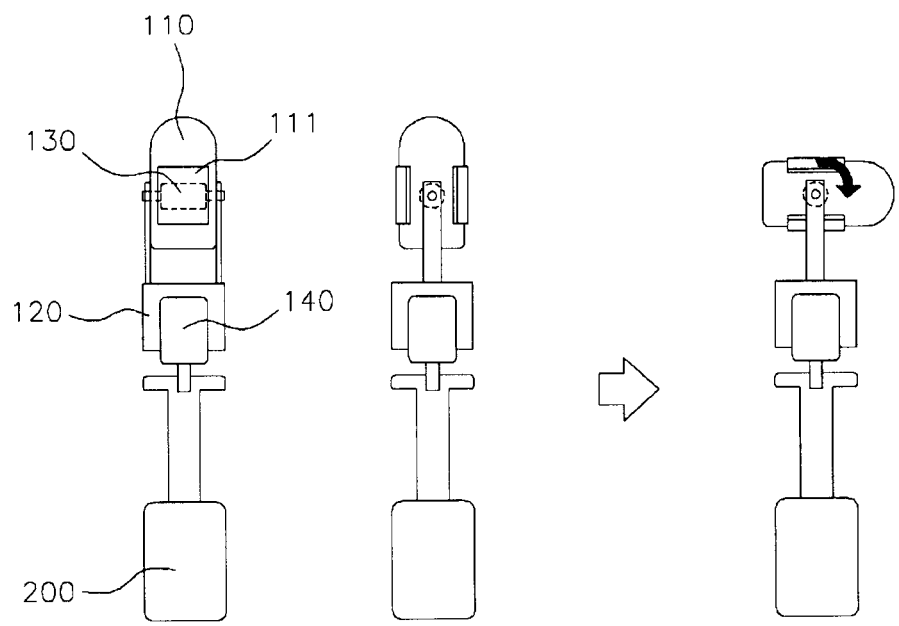
FIG. 9 illustrates an exemplary process in which a head part rotates driven by an internal rotation motor embedded in the head part.

FIG. 9 illustrates a process in which the head part rotates driven by the internal rotation motor embedded in the head part. In various embodiments of the present invention, the pop-up lever 100 controls the head part 100 to rotate, for example, by about 90° in a direction toward the driver when the pop-up lever 100 is first popped up, so that during the first driving of the pop-up lever 100, a driver feels as if the head part 110 of the pop-up lever 100 bows to the driver, thereby providing familiarity to the driver.

Accordingly, the controller rotates the internal rotation motor 130 by the predetermined number of times of rotation (for example, the number of times of rotation required for rotating the head part 110 by about 90°) when the pop-up lever 100 is first popped-up (for example, when the vehicle starts, or when the input is performed through the pop-up button unit), so as to rotate the head part 110. In this case, the head part 110 is rotated in the horizontal direction based on the internal rotation motor 130 hinge-coupled to the support of the supporting part 120 as an axis.

In a case where the head part 110 is completely rotated, for example, by about 90° by the driving of the internal rotation motor 130, the controller may control the head part 110 to be returned by controlling the internal rotation motor 130 to rotate by the same number of times of rotation in an opposite direction.

Figure 10:
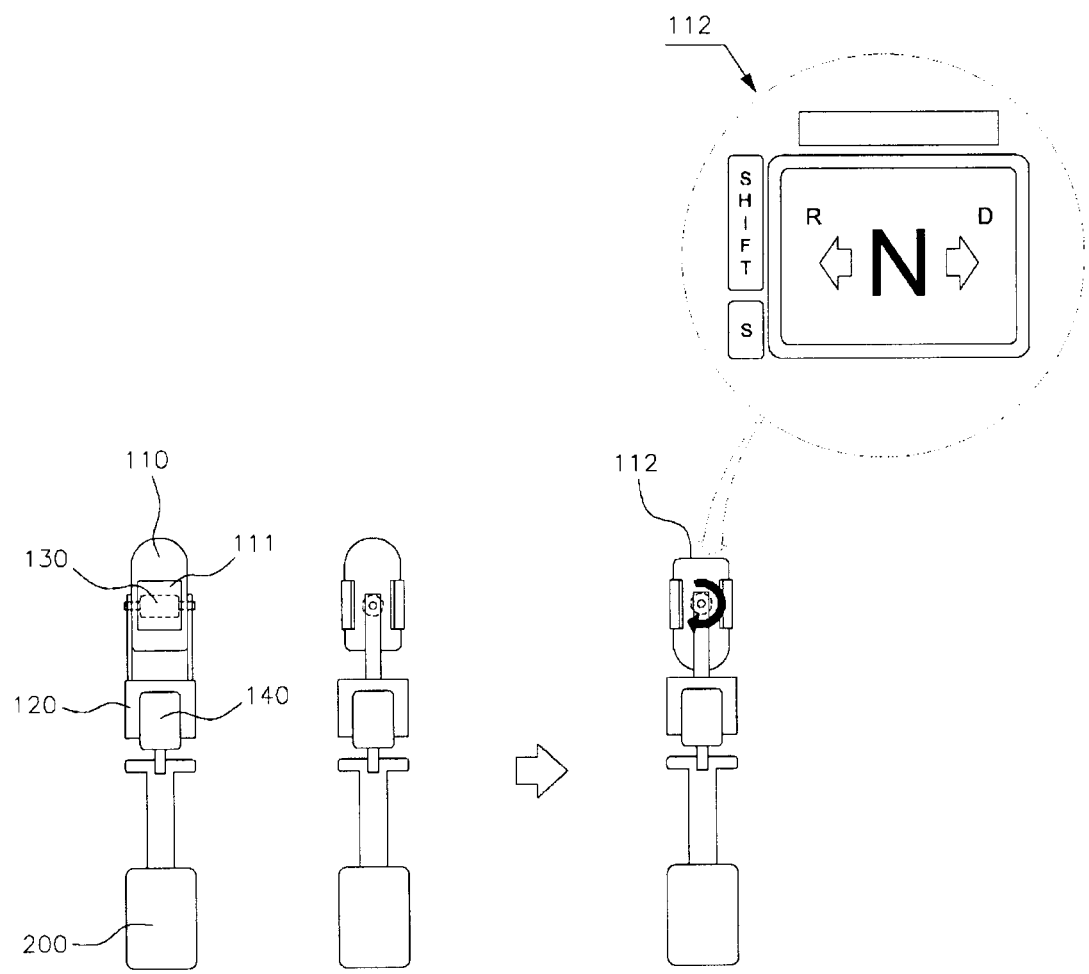
FIG. 10 illustrates a rotation process of the head part when shift control is performed for exposing an input unit formed on a lower surface of the head part to a driver.

FIG. 10 illustrates a rotation process of the head part when shift control is performed for exposing an input unit formed on the lower surface of the head part to the driver. In various embodiments of the present invention, after the pop-up lever 100 is first popped-up, the information display unit 111 formed on a side surface of the head unit 110 is exposed to the driver, and the gear shift stage input unit 112 formed on the lower surface of the head part 110 faces the lower surface, so that the gear shift stage input unit 112 is not exposed to the driver.

In this case, when an input is performed through the information display unit 111, the controller drives the internal rotation motor 130 so as to receive control of the gear shift through the gear shift stage input unit 112 formed on the lower surface of the head part 110, thereby controlling the head part 110 to rotate, for example, by about 180°. Accordingly, the gear shift stage input unit 112 formed on the lower surface of the head part 110 is controlled to face in an upper direction by the rotation of the head part 110. Accordingly, the input unit formed on the lower surface of the head part 110 is exposed to an upper side by the rotation of the head part 110, and waits for an input of the driver.

Accordingly, when the pop-up lever 100 is first popped-up, the head part 110 exposes only the information display unit 111 to the driver, and displays emotion information or notification information through the information display unit 111 and waits for the input of the information display unit 111, and when the input is performed by the information display unit 111, the head part 110 rotates, for example, by about 180° and the lower surface of the head part 110 is exposed to the upper side, so that it is possible to control the gear shift through the pop-up lever 100.

Figure 11:
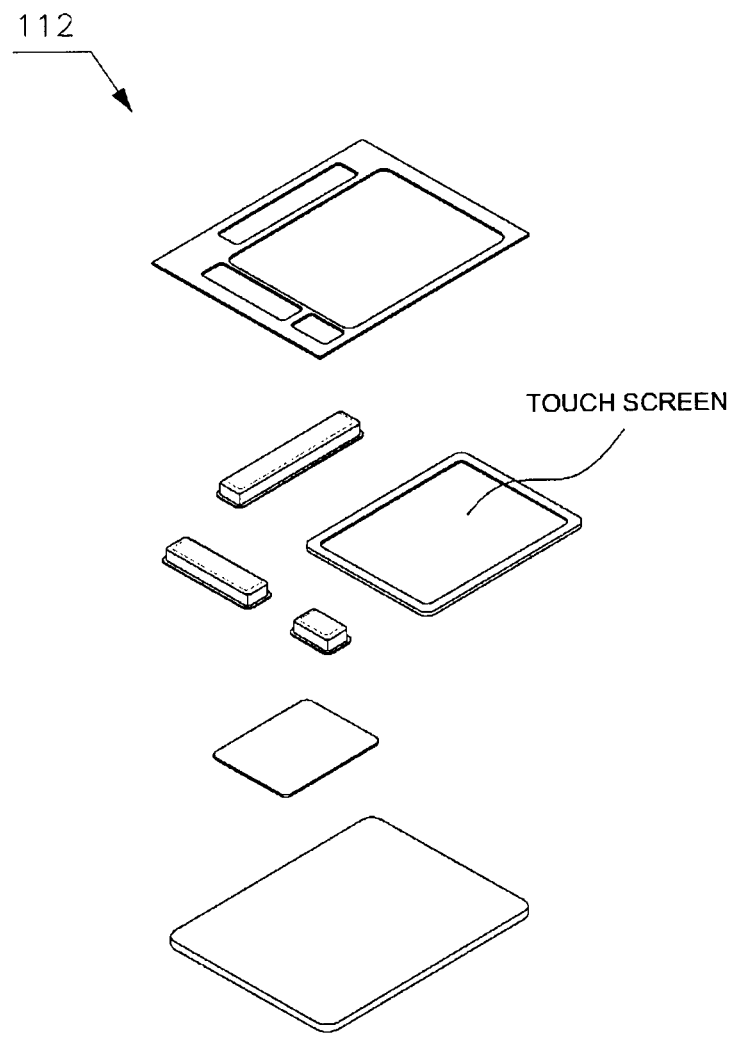
FIG. 11 is an exploded perspective view illustrating an exemplary input unit according to the present invention.

FIG. 11 is an exploded perspective view illustrating the input unit according to various embodiments of the present invention. As illustrated, the input unit in various embodiments of the present invention includes one or more input buttons, a touch screen, a circuit board, a supporting board, and a cover. However, the present invention may include only one touch screen, and is not limited thereto.

In various embodiments of the present invention, the input unit serves to display a gear shift stage through the touch screen, receive an input from the driver, and transmit the received input to the controller. In this case, the input unit may include one or more input buttons as an auxiliary input means, but the auxiliary input means is not an essential element.

Figure 12:
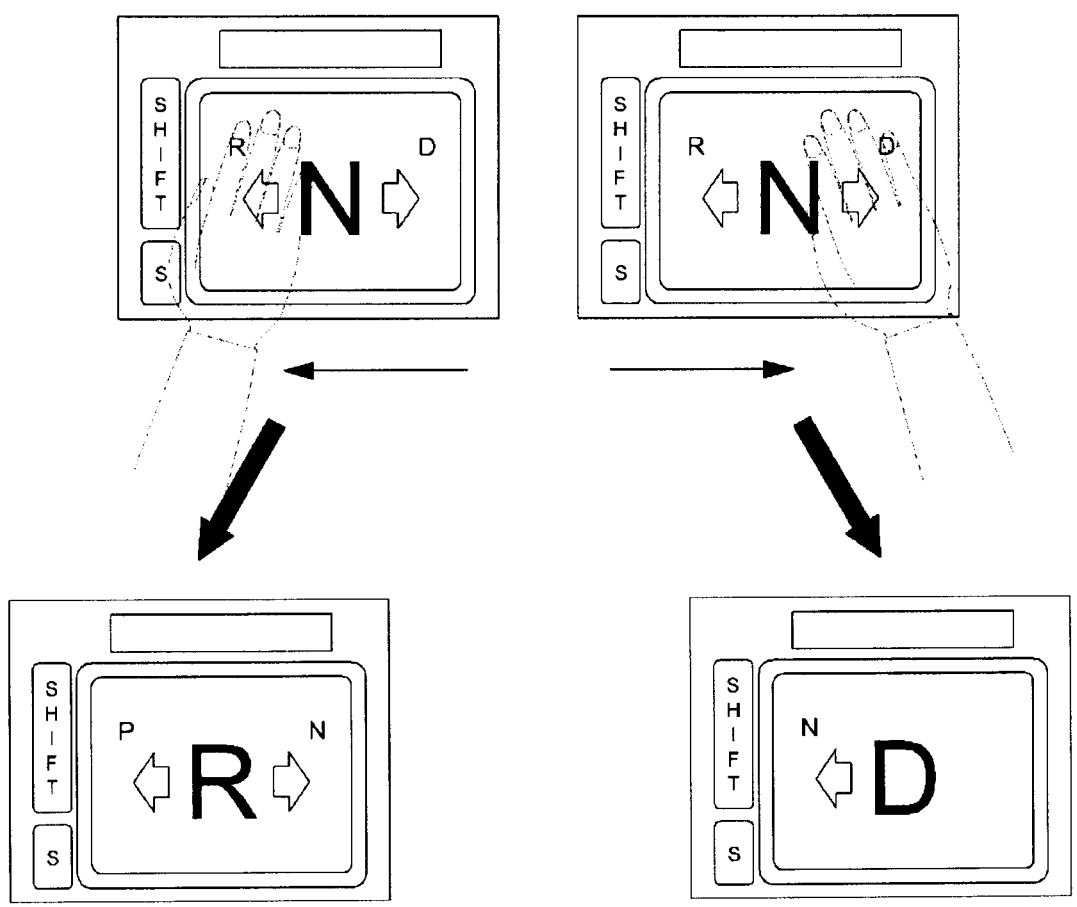
FIG. 12 is a schematic diagram illustrating an exemplary gear shift stage input method through a gear shift stage input unit.

FIG. 12 is a schematic diagram illustrating a gear shift stage input method through the gear shift stage input unit. As illustrated, in an initial input standby state of the pop-up type electronic auto shift lever 300 of the present invention (that is, in a state where the driver inputs a touch through the information display unit 111 of the head part 110 so that the gear shift stage input unit 112 upwardly protrudes), the controller provides gear shift stage information to the gear shift stage input unit 112, the N-stage, which is an initial gear shift stage, is displayed through the touch screen of the gear shift stage input unit 112 to wait for an input of the driver.

In this case, the R-stage and the D-stage, which are adjacent to the N-stage, are displayed together, and the N-stage, which is the current gear shift stage, is largely displayed at a center of the touch screen, and the shiftable R-stage and D-stage are displayed at left and right sides of the N-stage.

In this case, the driver may select a desired gear shift stage through an input, for example, a slide input, through the touch screen of the gear shift stage input unit 112, and in this case, a gear shift stage input signal by the touch input of the gear shift stage input unit 112 is transmitted to the controller, and the controller generates a shift signal based on the gear shift stage input signal and transmits the generated shift signal to the automatic transmission control unit of the vehicle. Simultaneously, the controller may provide gear shift stage information changed by the gear shift stage input unit 112 and make the gear shift stage changed by the driver be displayed through the touch screen of the gear shift stage input unit 112.

In this case, in various embodiments of the present invention, the controller may determine whether an input of a brake pedal of the vehicle is made by interworking with a gear shift stage controller of the automatic transmission, and may make the shift of the gear shift stage be performed only when the input of the brake pedal of the vehicle is made, and make a notification message be output when the input of the brake pedal of the vehicle is not made.

Figure 13:
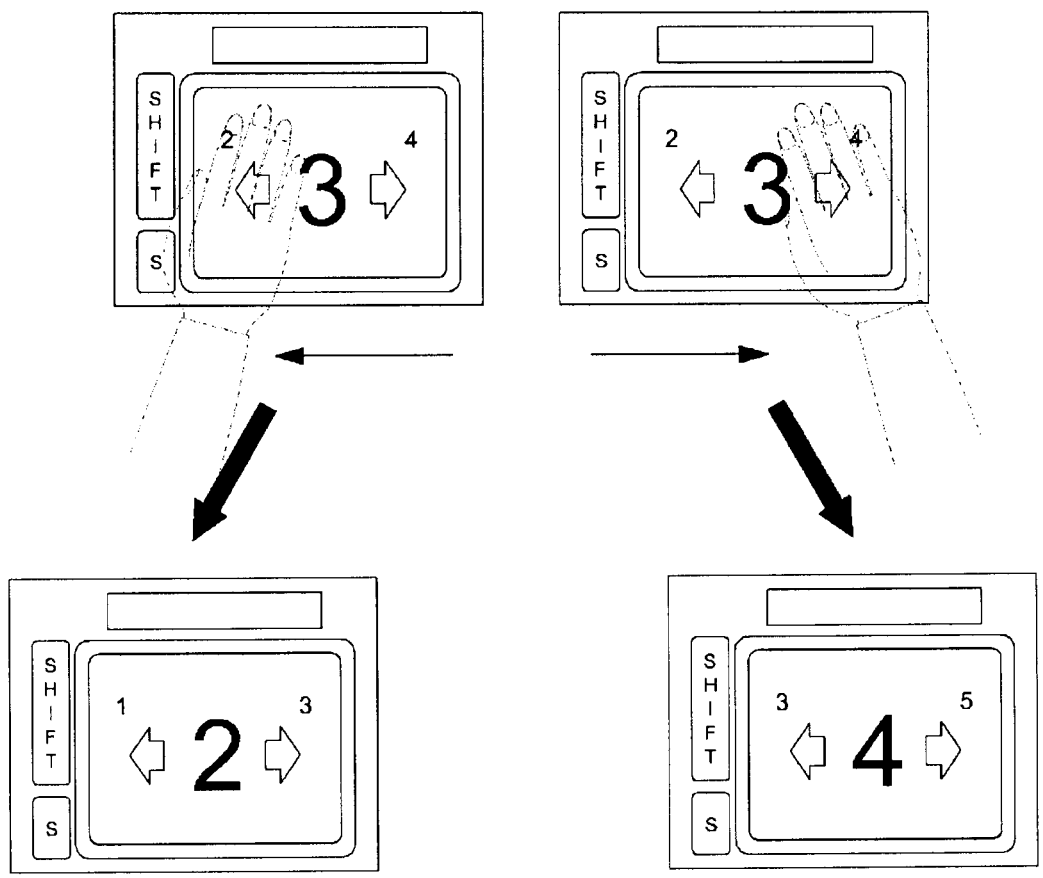
FIG. 13 illustrates an exemplary variation of a number of a gear shift stage.

As illustrated in FIG. 13, the gear shift stage is shifted, and a number of the gear shift stage is also changed. The process is performed in the same or similar manner as in the aforementioned gear shift process, so a detailed description thereof will be omitted.

FIGS. 14A and 14B respectively illustrate exemplary embodiments of various emotion information and notification information displayed through the information display unit. As illustrated, emotion information displayed with a figure or a picture may be displayed through the information display unit 111, or notification information displayed with a character string may be displayed through the information display unit 111.

In exemplary embodiments, the information display unit 111 is formed of two (or more) information display units of a first information display unit and a second information display unit, and the first information display unit and the second information display unit are disposed in opposite directions, so that the first information display unit at one side displays the emotion information, and the second information display unit at the other side displays the notification information.

In various other embodiments of the present invention, the information display unit may further include a speaker means, and voice information may be further output through the speaker means. A configuration of the speaker means in this case may be the same as or similar to a known technical configuration.

For convenience in explanation and accurate definition in the appended claims, the terms "upper" or "lower", "up" or "down", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A pop-up type electronic auto shift lever, which is disposed in a console of a vehicle, and interworks with an automatic transmission control unit of an automatic transmission, the pop-up type electronic auto shift lever comprising:
   a pop-up lever which includes a gear shift stage input unit including a touch screen, generates a gear shift stage input signal according to a touch input of the gear shift stage input unit, and outputs the generated gear shift stage input signal;
   a pop-up part which includes a pop-up motor, is disposed at a lower end of the pop-up lever, and pops up the pop-up lever when being driven; and
   a controller which controls the pop-up lever and the pop-up part, provides gear shift stage information to the gear shift stage input unit of the pop-up lever, generates a shift signal based on the gear shift stage input signal received from the gear shift stage input unit, and transmits the generated shift signal to the automatic transmission control unit of the vehicle;
   wherein the controller controls the pop-up lever to be inserted into the console of the vehicle by driving the pop-up part when the pop-up lever is not used, and controls the pop-up lever to protrude outside the console of the vehicle by driving the pop-up part when the pop-up lever is used, and
   wherein the controller interworks with a collision detection sensor of the vehicle, and drives the pop-up motor during a vehicle collision to control the pop-up lever to be inserted into the console.

2. The pop-up type electronic auto shift lever of claim 1, wherein the pop-up lever includes:
   a head part which includes the gear shift stage input unit;
   a supporting part which is disposed under the head part, and hinge-coupled to the head part, and supports the head part to be rotatable in a vertical direction; and
   an internal rotation motor which is embedded inside the head part, rotates the head part when being driven, and is controlled by the controller.

3. The pop-up type electronic auto shift lever of claim 2, wherein the head part further includes an informal display unit which includes one or more touch screens, and is disposed on a side surface of the head part; and wherein the gear shift stage input unit is disposed at a lower surface of the head part, wherein when a touch is input from the information display unit, the controller drives the internal rotation motor to control the head part to rotate by about 180°, to upwardly expose the gear shift stage input unit.

4. The pop-up type electronic auto shift lever of claim 1, further comprising:

a rotation torque motor which is disposed between the pop-up lever and the pop-up part in a vertical direction and connects the pop-up lever and the pop-up part, wherein the rotation torque motor is controlled by the controller, and when the rotation torque motor operates, the pop-up lever is rotated in a horizontal direction.

5. The pop-up type electronic auto shift lever of claim 4, wherein:

a body of the rotation torque motor is coupled with and fixed to a lower end of a supporting part of the pop-up lever;

a rod of the rotation torque motor is fixedly coupled to an upper end of the pop-up part, and the pop-up lever and the pop-up part are connected with each other.

6. The pop-up type electronic auto shift lever of claim 4, wherein the controller interworks with a navigation system provided in the vehicle, receives steering guide information of the navigation system, and controls the rotation torque motor to be rotated in a direction corresponding to a direction of the steering guide information.

7. The pop-up type electronic auto shift lever of claim 1, wherein the controller controls the internal rotation motor so as for the head part to be rotated by about 90° when the pop-up lever is first popped-up.

8. The pop-up type electronic auto shift lever of claim 1, wherein the head part further includes a speaker unit including one or more speaker means, and the controller provides one or more of the emotion information and the notification information to the speaker unit.

9. The pop-up type electronic auto shift lever of claim 1, wherein:

in the gear shift stage information provided by the controller, relative information between each gear shift stage and an adjacent gear shift stage is preset and stored in setting a plurality of elements of gear shift stage information of the vehicle;

when a slide input is performed on the gear shift stage input unit, the gear shift stage input unit outputs slide input information including a slide direction, and the controller provides the gear shift stage input unit with information about the adjacent gear shift stage corresponding to the direction of the slide input information, and when the touch input is performed on the gear shift stage input unit, the gear shift stage input unit generates the gear shift stage input signal and outputs the generated gear shift stage input signal.

10. The pop-up type electronic auto shift lever of claim 1, further comprising:

a pop-up button unit which is disposed on the console of the vehicle and outputs a pop-up signal during an input, wherein the controller is connected with the pop-up button unit to drive the pop-up part to pop up the pop-up lever when receiving the pop-up signal.

* * * * *